United States Patent
Bastide et al.

(10) Patent No.: US 11,106,747 B2
(45) Date of Patent: Aug. 31, 2021

(54) ONLINE CONTENT MANAGEMENT

(71) Applicant: INTERNATIONAL BUSINESS MACHINES CORPORATION, Armonk, NY (US)

(72) Inventors: Paul R. Bastide, Ashland, MA (US); Matthew E. Broomhall, Goffstown, NH (US); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 16/443,955

(22) Filed: Jun. 18, 2019

(65) Prior Publication Data
US 2020/0401636 A1   Dec. 24, 2020

(51) Int. Cl.
```
G06F 7/00        (2006.01)
G06F 16/9535     (2019.01)
G06F 16/9536     (2019.01)
G06F 16/908      (2019.01)
G06Q 50/00       (2012.01)
```
(52) U.S. Cl.
CPC ........ *G06F 16/9535* (2019.01); *G06F 16/908* (2019.01); *G06F 16/9536* (2019.01); *G06Q 50/01* (2013.01)

(58) Field of Classification Search
CPC .............. G06F 16/9535; G06F 16/908; G06F 16/9536; G06Q 50/01
USPC ........................................ 707/722, 748, 758
See application file for complete search history.

(56) References Cited

U.S. PATENT DOCUMENTS

| | | |
|---|---|---|
| 9,753,998 B2 | 9/2017 | Bastide |
| 9,830,313 B2 | 11/2017 | Pasternack |
| 2013/0179806 A1 | 7/2013 | Bastide |

(Continued)

FOREIGN PATENT DOCUMENTS

CN           103455639 A       12/2013

OTHER PUBLICATIONS

Disclosed Anonymously, "System and Method for Recommending Social Media Hashtags", An IP.com Prior Art Database Technical Disclosure, IP.com No. IPCOM000222352D, IP.com Electronic Publication Date: Sep. 26, 2012, 4 pages.

(Continued)

*Primary Examiner* — Md I Uddin
(74) *Attorney, Agent, or Firm* — Richard A. Wilhelm

(57) ABSTRACT

The method, computer program product and computer system may include computing device which may collect message data containing one or more metadata tags from one or more collaboration and social media communication networks. The computing device may load the message data into a datastore. The computing device may determine the utility of the one or more metadata tags contained within the message data. The computing device may determine the effectiveness of the one or more metadata tags contained within the message data. The computing device may combine the calculated frequency and the calculated information gain of the one or more metadata tags using regression analysis and may activate a metadata tag management routine for the one or more metadata tags if the combined frequency and information gain falls below a threshold value.

17 Claims, 8 Drawing Sheets

(56) References Cited

U.S. PATENT DOCUMENTS

| | | | |
|---|---|---|---|
| 2014/0256408 A1* | 9/2014 | Meyer | G07F 17/323 463/25 |
| 2015/0193550 A1 | 7/2015 | Bastide | |
| 2015/0205830 A1 | 7/2015 | Bastide | |
| 2016/0117063 A1 | 4/2016 | Fuller | |
| 2016/0253715 A1 | 9/2016 | Xie | |
| 2017/0053013 A1 | 2/2017 | Weinsberg | |
| 2017/0103071 A1 | 4/2017 | Albouyeh | |
| 2017/0169026 A1 | 6/2017 | Nalliah | |
| 2018/0189394 A1 | 7/2018 | Grant | |
| 2018/0203841 A1 | 7/2018 | Anders | |

OTHER PUBLICATIONS http://support.gnip.com/apis/, "Gnip APIs", Documentation to help you integrate Gnip's APIs into your product, Accessed on Mar. 25, 2019, 4 pages.

IBM, "Natural Language Classifier", https://www.ibm.com/watson/services/natural-language-classifier/, Accessed on Mar. 25, 2019, 10 pages.

Kamath et al., "Spatio-Temporal Dynamics of Online Memes: A Study of Geo-Tagged Tweets", WWW 2013, May 13-17, ACM, 11 pages.

Roberts, "Saudi ministers are harassing critics on twitter", The Washington Post, Post Partisan Opinion, Accessed on Mar. 25, 2019, 3 pages.

Smarsh, "Social Media Capture, Archiving and Compliance Solutions", https://www.smarsh.com/connectors/social/, Accessed on Jun. 14, 2019, 7 pages.

Wikipedia, "Hashtag", https://en.wikipedia.org/wiki/Hashtag, Accessed on Mar. 25, 2019, 12 pages.

Mell et al., "The NIST Definition of Cloud Computing", Recommendations of the National Institute of Standards and Technology, Special Publication 800-145, Sep. 2011, 7 pages.

* cited by examiner

ONLINE CONTENT MANAGEMENT

BACKGROUND

The present invention relates generally to a method, system, and computer program for the management of online content. More particularly, the present invention relates to a method, system, and computer program for managing metadata tags.

Online social networks and collaboration tools are connecting people and information in logical and organized ways to share and process information between users. The most common mechanisms of sharing and processing information are email, text messages, and social networks. These mechanisms enable one to rapidly share information with others, connect, gather and discuss many things and topics. Collaborators, i.e. users, use hashtags to apply dynamic, user-generated tags to enable others to easily find messages with a specific theme or content. Hashtags are a type of metadata tag used on online social networks and collaboration tools and are denoted using the "#" sign followed by a word or un-spaced phrase, which is associated with a message. Metadata tags that users and collaborators employ are not limited to hashtags (#), but include 'at' mentions (@), goals ($), and many other symbols. The use of a hashtag in posts to an activity stream or "wall" of a social media network, e.g., Facebook, LinkedIn, and the like, creates an open communication channel.

BRIEF SUMMARY

An embodiment of the invention may include a method, computer program product and computer system for managing metadata tag usage. The method, computer program product and computer system may include computing device which may collect message data containing one or more metadata tags from one or more collaboration and social media communication networks and load the message data into a datastore. The computing device may determine the utility of the one or more metadata tags contained within the message data. The utility may be based on a calculated frequency of the one or more metadata tags. The computing device may determine the effectiveness of the one or more metadata tags contained within the message data. The effectiveness may be based on a calculated information gain associated the one or more metadata tags contained in the message data. The computing device may combine the calculated frequency and the calculated information gain of the one or more metadata tags using regression analysis and activate a metadata tag management routine for the one or more metadata tags whose combined calculated frequency and calculated information gain falls below a threshold value. The computing device may receive a message containing a metadata tag that has a utility and effectiveness calculation that falls below the threshold from a user on the one or more collaboration and social media communication networks. The computing device may generate a proof-of-work request for completion by the user and send the proof-of-work request to the user. The computer device may determine the status of the proof-of-work request and post the message to the one or more collaboration and social media communication networks in response to determining the proof-of-work request has been completed by the user or delay the posting of the message to the one or more collaboration and social media communication networks in response to determining the proof-of-work request has not been completed by the user.

DETAILED DESCRIPTION

Figure 1A:
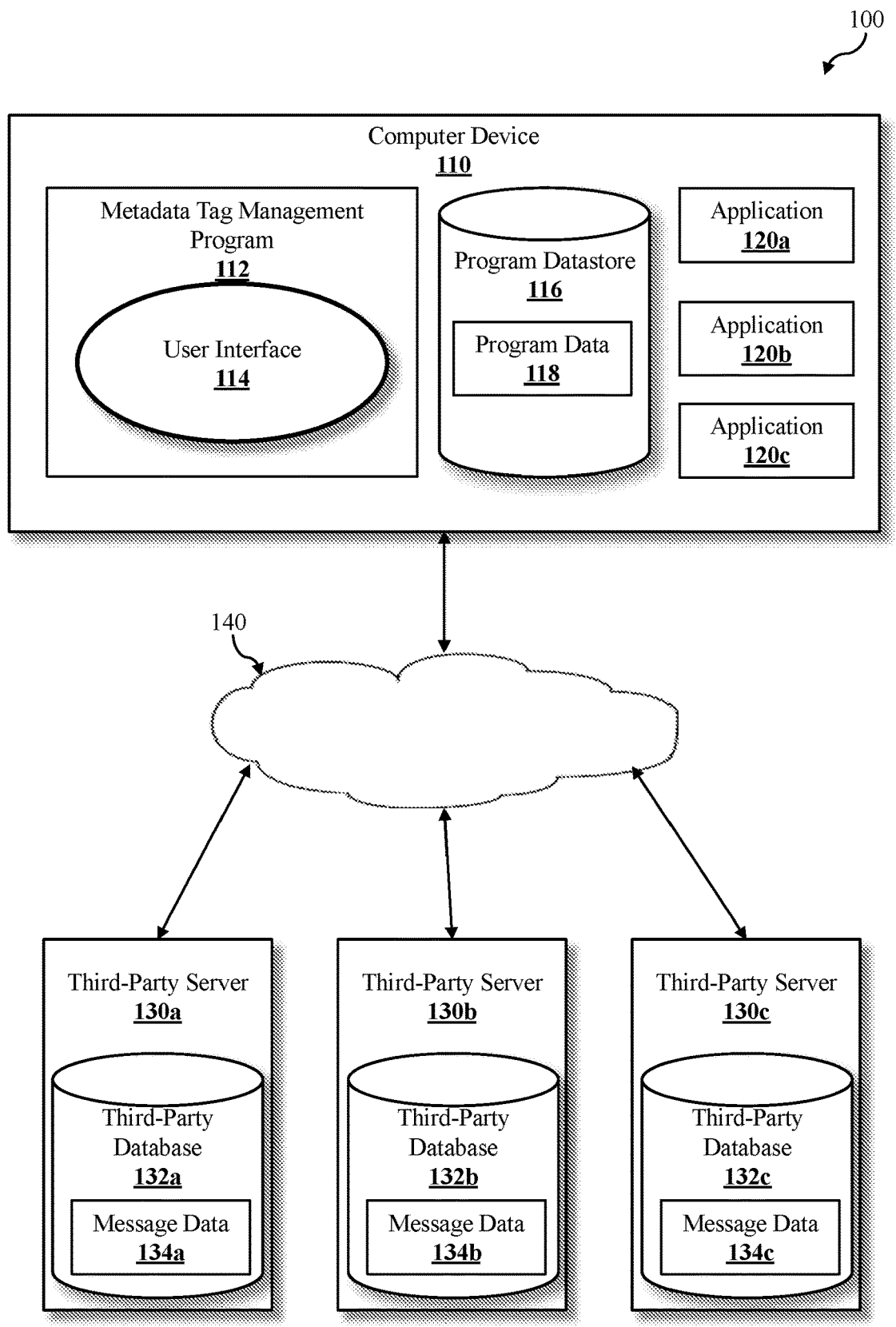
FIG. 1a illustrates a system for metadata tag management, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for managing metadata tags, e.g. hashtags. Currently, there is no means for monitoring the overuse or underuse of a metadata tag and to manage the metadata tag accordingly. Presently, a user may use any metadata tag they wish in conjunction with any message they wish to convey through social media and collaborative applications. Thus, a metadata tag can become overused, i.e. overpopulated, in the sense that a user can use a metadata tag in conjunction with a message regardless if that metadata tag is actually relevant to the message which results in the metadata tag being diluted of its meaning. Further, more generic metadata tags can become overused during trending events such as sports competitions, award ceremonies, major news events, etc. For example, the hashtag "#basketball" is a generic hashtag which may see its use spike during the National Basketball Association® (NBA®) finals or during the National Collegiate Athletic Association® (NCAA®) March Madness tournament. Thus, the hashtag "#basketball" will become overwhelmed with posts making it hard for users to digest the content associated with the hashtag or result in users only seeing messages regarding a very specific event associated with a broad topic. Embodiments of the present invention enable the management of metadata tags that are becoming overused by monitoring the information gain and effectiveness associated with a metadata tag. Embodiments of the present invention detect when a metadata tag is becoming popular, e.g. posted frequently across social media and collaborative applications, and then initiates a management routine for that metadata tag. The management routine of the present invention detects when a user on a social media or collaborative application is posting a message with the metadata tag hashtag and requires the user to complete a proof-of-work to verify appropriate use of the metadata tag. Embodiments of the present invention allow for the delay of message posting or for adding temporary additional specificity to the message metadata tag in the event a proof-of-work is not completed or accepted.

Reference will now be made in detail to the embodiments of the present invention, examples of which are illustrated in the accompanying drawings, wherein like reference numerals refer to like elements throughout. Embodiments of the invention are generally directed to a system for managing hashtags.

FIG. 1 illustrates a metadata tag management system 100, in accordance with an embodiment of the invention. In an example embodiment, metadata tag management system 100 may include computer device 110, and third-party servers 130a, 130b, 130c interconnected via network 140.

In the example embodiment, the network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), or a wide area network (WAN). In general, the network 140 can be any combination of connections and protocols that will support communications between the computer device 110 and the third-party servers 130a, 130b, 130c.

The computer device 110 may include hashtag management program 112, program datastore 116, and applications 120a, 120b, 120c. In the example embodiment, the computer device 110 may be a desktop computer, a notebook, a laptop computer, a tablet computer, a thin client, or any other electronic device or computing system capable of storing compiling and organizing audio, visual, or textual content and receiving and sending that content to and from other computing devices, such as the third-party servers 130a, 130b, 130c, and other computer devices 110 via the network 140. The computer device 110 is described in more detail with reference to FIG. 6. While only a single computer device 110 is illustrated, it can be appreciated that any number of computer devices 110 may be part of the hashtag management system 100.

The metadata tag management program 112 may include a user interface 114. The metadata tag management program 112 is a program capable of analyzing metadata tag usage in online messages and determining the utility of a metadata tag, e.g. if a hashtag is being frequently used, across the applications 120a, 120b, 120c. Further, the metadata tag management program 112 may manage a metadata tag if it is determined that the metadata tag is being frequently used. The metadata tag management program 112 is described in more detail below with reference to FIG. 1b.

The user interface 114 includes components used to receive input from a user on the user device 110 and transmit the input to the hashtag management program 112, or conversely to receive information from the metadata tag management program 112 and display the information to the user on the user device 110. In an example embodiment, the user interface 114 uses a combination of technologies and devices, such as device drivers, to provide a platform to enable users of user device 110 to interact with the metadata tag management program 112. In the example embodiment, user interface 114 receives input, such as textual input received from a physical input device, such as a keyboard.

The program datastore 116 may include program data 118. The program datastore 116 may be any storage media capable of storing and managing data, such as, but not limited to, storage media resident in the computer device 110 and/or removeable storage media. For example, the program datastore 116 may be, but is not limited to, a hard drive, a solid stated drive, a USB drive, or a memory card, etc. The program datastore 116 may be, for example, but not limited to, an operational or an analytical datastore. Further, the program datastore 116 may be a collection of simple files, such as, but not limited to, e-mails, PDFs, word documents, spreadsheets, etc. The program data 118 may be a collection of the message data 134a, 134b, 134c associated with the applications 120a, 120b, 120c including, but not limited to, audio, visual, and textual files. For example, the program data 118 may include social media feed posts, online messages, emails, tweets, etc. The program datastore 116 located on the computer device 110 may be accessed through the network 140. The program datastore 116 is described in more detail with reference to FIG. 6.

The applications 120a, 120b, 120c be any online social network, online messaging application, and/or collaboration service such as, but not limited to, social media applications, email applications, and instant messaging applications, etc. Examples of such applications 120a, 120b, 120c may be Twitter®, Instagram®, Facebook®, IBM® Connections, Jive®, Yammer®, Microsoft Outlook®, Gmail®, Lotus Notes®, etc. While three applications 120a, 120b, 120c are illustrated, it can be appreciated that any number of applications 120 may be part of the hashtag management system 100 including less than three or more than three depending on the user. As described in the example above, the applications 120a, 120b, 120c may be a social media platform such as Twitter®. Thus, the metadata tag management program 112 may use data, i.e. the message data 134a, 134b, 134c, associated with the application 120a, 120b, 120c to analyze a user's messages and associated metadata tag usage on the applications 120a, 120b, 120c. The data associated with applications 120a, 120b, 120c, i.e. the message data 134a, 134b, 134c, may be stored on third-party servers 130a, 130b, 130c associated with the applications 120a, 120b, 120c, respectively. For example, a user on user device 110 may have Twitter®, Facebook®, and Instagram®, accounts, i.e. applications 120a, 120b, 120c, and the data associated with each of the applications 120a, 120b, 120c would be stored on the Twitter®, Facebook®, and Instagram®, servers, i.e., the third-party servers 130a, 130b, 130c.

The third-party servers 130a, 130b, 130c may include third-party databases 132a, 132b, 132c. While three third-party servers 130a, 130b, 130c are illustrated, it can be appreciated that any number of third-party servers 130 may be part of the hashtag management system 100 including less than three or more than three depending on the user. In the example embodiment, the third-party servers 130a, 130b, 130c may be a desktop computer, a notebook, a laptop computer, a tablet computer, a thin client, or any other electronic device or computing system capable of storing compiling and organizing audio, visual, or textual content and receiving and sending that content to and from other computing devices, such as the user device 110 via the network 140. In some embodiments, the third-party servers 130a, 130b, 130c include a collection of devices or data sources. The third-party servers 130a, 130b, 130c are described in more detail with reference to FIG. 6.

The third-party databases 132a, 132b, 132c may store the message data 134a, 134b, 134c associated with the applications 120a, 120b, 120c including, but not limited to, audio, visual, and textual files. For example, the message data 134a, 134b, 134c may include social media feed posts, online messages, emails, tweets, etc. Further, the message data 134a, 134b, 134c may include any metadata associated with the audio, visual, and textual files including but not limited to, hashtags (#), 'at' mentions (@), goals ($), unique message identifiers, date stamps, time stamps, GPS location of where the message data 134a, 134b, 134c was generated, the longitude and latitude location of where the message data 134a, 134b, 134c was generated, etc. The third-party databases 132a, 132b, 132c may be any storage media capable of storing data capable of storing data, such as, but not limited to, storage media resident in the third-party servers 130a, 130b, 130c and/or removeable storage media. For example, the third-party databases 132a, 132b, 132c may be, but is not limited to, a hard drive, a solid stated drive, a USB drive, or a memory card, etc. The third-party databases 132a, 132b, 132c located on the third-party servers 130a, 130b, 130c may be accessed through the network 140. The third-party databases 132a, 132b, 132c are described in more detail with reference to FIG. 6.

Figure 1B:
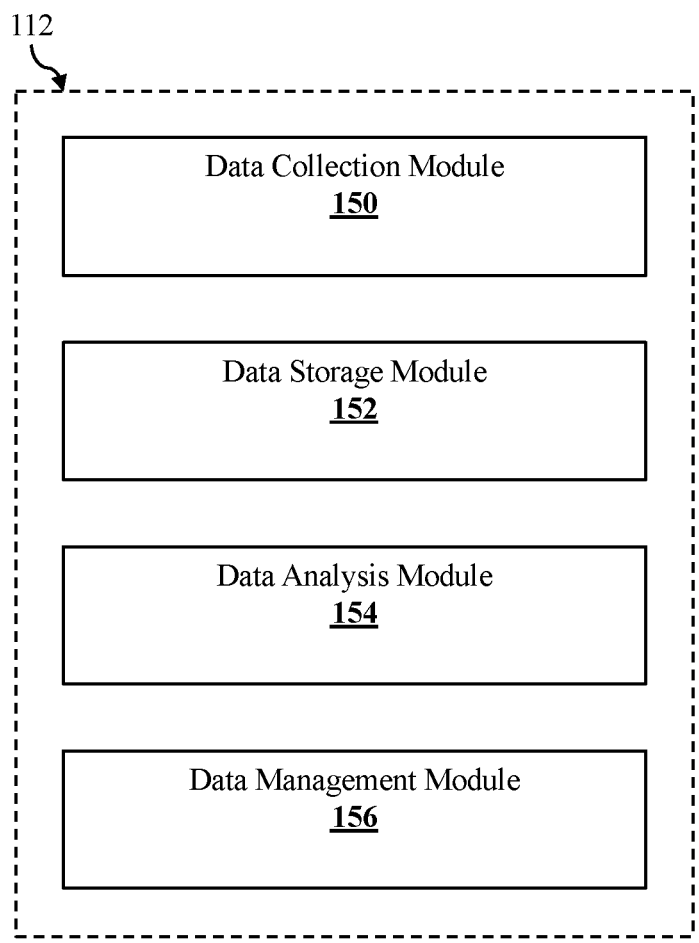
FIG. 1b illustrates example operating modules of the metadata tag management program of FIG. 1a, in accordance with an embodiment of the invention.

Referring to FIG. 1b, example modules of the metadata tag management program 112 are illustrated. In an example embodiment, the metadata tag management program 112 may include 4 modules: the data collection module 150, the data storage module 152, the data analysis module 154, and the data management module 156.

The data collection module 150 collects the message data 134a, 134b, 134c associated with the applications 120a, 120b, 120c. For example, the data collection module 150 may collect the message data 134a, 134b, 134c associated with a plurality of collaboration and social media communication services, such as, but not limited to, Twitter®, Instagram®, Facebook®, IBM® Connections, Jive®, Yammer®, Microsoft Outlook®, Gmail®, Lotus Notes®, etc. The data collection module 150 may use any data archiving tool capable of collecting and archiving collaboration and social media communications, such as, but not limited to, application programming interfaces (APIs). For example, the data collection module 150 may use a Gnip® API or a Smarsh® API to archive the message data 134a, 134b, 134c.

The data collection module 150 may collect the message data 134a, 134b, 134c in real-time or may collect the message data 134a, 134b, 134c in a batch at specified time intervals such as, but not limited to, 15 minutes, 30 minutes, an hour, a day, a week, a month, etc. Thus, the data collection module 150 may constantly collect the message data 134a, 134b, 134c from the third-party servers 130a, 130b, 130c.

The data storage module 152 loads the message data 134a, 134b, 134c which has been collected by the data collection module 150 into the program datastore 116 as program data 118. The data storage module 152 may load the message data 134a, 134b, 134c into the program datastore 116 according to a schema. For example, the data storage module 152 may identify, but not limited to, conversation-id, e.g. a usernames, times of completion, dates, hashtags, unique message identifiers, multipurpose internet mail extensions (MIME) data, locations, subject matter, and other metadata of the message data 134a, 134b, 134c. An example schema may be, but is not limited to:

Message Details {Body, Subject, Metadata}
Hashtags
Unique Message Identifier
Date/Time
Location {GPS, Longitude/Latitude}

The data storage module 152 may populate the program datastore 116 using natural language processing such as, but not limited to, IBM Watson natural language classifier. Also, the data storage module 152 may populate the program datastore 116 according to sentiment, severity, or importance metadata. Further, the data storage module 152 may populate the program datastore 116 with custom labels from the MIME data such as, but not limited to, tags or labels used to populate the topic for email messages, contained within the message data 134a, 134b, 134c. The data storage module 152 may de-normalize the message data 134a, 134b, 134c according to metadata tag used in the message data 134a, 134b, 134c such that a single metadata tag is used per entry in the program datastore 116.

The data analysis module 154 detects the utility of metadata tags contained within the program data 118. The data analysis module 154 may detect hashtag utility by calculating the usage of one or more hashtags contained within the program data 118 loaded into the program datastore 116. The data analysis module 154 may calculate for example, but not limited to, the frequency, and the density of the metadata tags contained within the program data 118. For example, but not limited to, the data analysis module 154 may determine the frequency the hashtag "#basketball" in the program data 118. The data analysis module 154 may determine the density of one or more metadata tags, i.e. the frequency of a metadata tag within a time interval, in the program data 118. Thus, the more metadata tags per time interval, the denser the metadata tag use is and vice versa. For example, but not limited to, the data analysis module 154 may determine the density of the hashtag "#basketball" in the program data 118. The data analysis module 154 may adjust the utility calculations based on the time interval of the program data 118.

The data analysis module 154 calculates the effectiveness of the one or more metadata tags contained within the program data 118 loaded into the program datastore 116. The effectiveness of a metadata tag is the purpose of the metadata tag and the spread of the purpose of the language in or content of the messages related to the metadata tag (or communications channel) in the context of a user's social media and collaborative network. The data analysis module 154 may calculate the effectiveness of the one or more metadata tags contained within the program data 118 by calculating the information gain associated with the one or more metadata tags and combining the information gain with the utility calculations for the one or more metadata tags. "Information gain" is the amount of information gained about a random variable from observing another random variable. Information gain is based on the change in entropy, i.e. the homogeneity, after a dataset, i.e. the program data 118, is split on an attribute. Thus, data analysis module 154 may calculate the entropy associated with one or more attributes of the program data 118 associated with a metadata tag. The larger the decrease in entropy, the higher the information gain, i.e. the more homogenous the utility of the metadata tag. The data analysis module 154 may analyze and calculate the entropy of one or more attributes of the program data 118 such as, but not limited to, the frequency of use of a metadata tag in a user's network, interaction with the metadata tag within a user's network, e.g. "likes", "favorites", or "retweets" of messages containing the metadata tag, the messages associated with the hashtag, the intended topic of the messages associated with the metadata tag, and the perspective(s) associated with the metadata tag within the user's network, i.e. the point-of-view expressed in conjunction with the metadata tag. The data analysis module 154 may analyze the attributes of the program data 118 using for example, but not limited to, natural language processing to analyze the message associated with the metadata tags. For example, but not limited to, the data analysis module 154 may determine the intended topic of the hashtag "#basketball" in the context of the program data 118. The intended topic could be for example, but not limited to, the National Basketball Association (NBA) basketball, college basketball, high school basketball, or amateur basketball, etc. Once the entropy of one or more of the above attributes is calculated by the data analysis module 154, the data analysis module 154 may calculate the information gain of the one or more metadata tags contained within the program data 118. The data analysis module 154 may calculate the information gain for a metadata tag contained within the program data 118 using for example, but not limited to, an ID3 algorithm, a Gini index, a Chi-Square, or a reduction in variance algorithm. A Kullback-Leibler divergence score may be used for measuring information gain to calculate the effectiveness a metadata tag in one embodiment. The resulting information gain may be calculated to be between 0 and 1, with 0 being high information gain, i.e. low entropy, and 1 being a low information gain, i.e. high entropy. The data analysis module 154 may calculate the effectiveness by correlating the utility calculation and the information gain calculation of the one or more metadata tags contained within the program data 118 using statistical modeling, such as, but not limited to, regression analysis. The data analysis module 154 determines if the calculated combination of the utility and the effectiveness of a metadata tag falls below as useful threshold number, which may trigger a management routine for that metadata tag. For example, if the combined calculation of utility and effectiveness for a metadata tag falls below 0.5, the metadata tag management program 112 may initiate the data management module 156. Thus, if a metadata tag is determined to have a high utility and a low effectiveness, i.e. high entropy/low information gain, the metadata tag management program 112 will initiate a management routine for that metadata tag.

The data management module 156 receives a message from a user on a social media and/or collaborative network that contains a metadata tag that has been determined to have a utility and effectiveness calculation that falls below a threshold value. The data management module 156 generates a proof of work for the user to complete before the metadata tag management program 112 will proceed with posting the message to the social media and/or collaborative network. The proof of work may include, but is not limited to, a completely automated public Turing test (CAPTCHA), or a re-CAPTCHA. If the user completes the proof-of-work, the data management module 156 will post the message with the metadata tag to the social media and/or collaborative network. If the user does not complete the proof-of-work, the data management module 156 will not post the message with the metadata tag to the social media and/or collaborative network. Further, the data management module 156 may request payment from a user instead of or in combination with a proof-of-work. If the user completes the payment, the data management module 156 will post the message with the hashtag to the social media and/or collaborative network. If the user does not complete the payment, the data management module 156 will not post the message with the metadata tag to the social media and/or collaborative network. In an embodiment of the invention, if the user does not complete a proof-of-work and/or payment, the data management module 156 may delay the posting of the user's message for a pre-determined period of time or until such as time the utility and effectiveness calculation for the hashtag contained within the message exceeds a threshold, e.g. 0.5.

In an embodiment, the data management module 156 may identify two or more topics for the one or more metadata tags determined to have a utility and effectiveness calculation that falls below a threshold value. For example, the data analysis module 156 may determine that the hashtag "#basketball" has a utility and effectiveness calculation that falls below a threshold value and the data management module 156 may identify two topics associated with the hashtag "#basketball" such as, but not limited to, college basketball, and NBA® basketball. The data analysis module 156 may split the hashtag "#basketball" into two secondary hashtags such as, but not limited to, #collegebasketball and #NBAbasketball. Thus, the metadata tag management program 112 prevents the hashtag "#basketball" from becoming overwhelmed with different topics related to basketball in general and splits the general hashtag, "#basketball", into secondary topical hashtags. The data analysis module 156 may re-calculate the utility and effectiveness calculation for the original metadata tag, i.e. "#basketball", based on continued data collection by the data collection module 150. If the utility and effectiveness calculation of the original hashtag exceeds a threshold number, the data management module 156 may collapse the secondary topical hashtags, e.g. #collegebasketball and #NBAbasketball, back into the original hashtag, e.g. #basketball.

In an embodiment, the data management module 156 may identify two or more perspectives for the one or more metadata tags determined to have a utility and effectiveness calculation that falls below a threshold value. The data management module 156 may identify two or more perspectives for the one or more metadata tags using, for example, but not limited to, natural language processing to analyze the program data 118 associated with the metadata tags. For example, the data analysis module 156 may determine that the hashtag "#parents" has a utility and effectiveness calculation that falls below a threshold value and the data management module 156 may identify two perspectives associated with the hashtag "#parents" such as, but not limited to, parenting is difficult, e.g. a parents perspective, and parents don't understand, e.g. a children's perspective. The data analysis module 156 may split the hashtag "#parents" into two secondary hashtags such as, but not limited to, "#parentingisdifficult" and "#parentsdontunderstand". Thus, the metadata tag management program 112 prevents the hashtag "#parents" from becoming overwhelmed with different perspectives related to parents in general and splits the general hashtag, "#parents", into secondary perspective hashtags. The data analysis module 156 may re-calculate the utility and effectiveness calculation for the original hashtag, e.g. "#parents" based on continued data collection by the data collection module 150. If the utility and effectiveness calculation of the original hashtag falls below a threshold number, the data management module 156 may collapse the secondary perspective hashtags, e.g. "#parentingisdifficult" and "#parentsdontunderstand", back into the original hashtag, e.g. "#parents".

Figure 2:
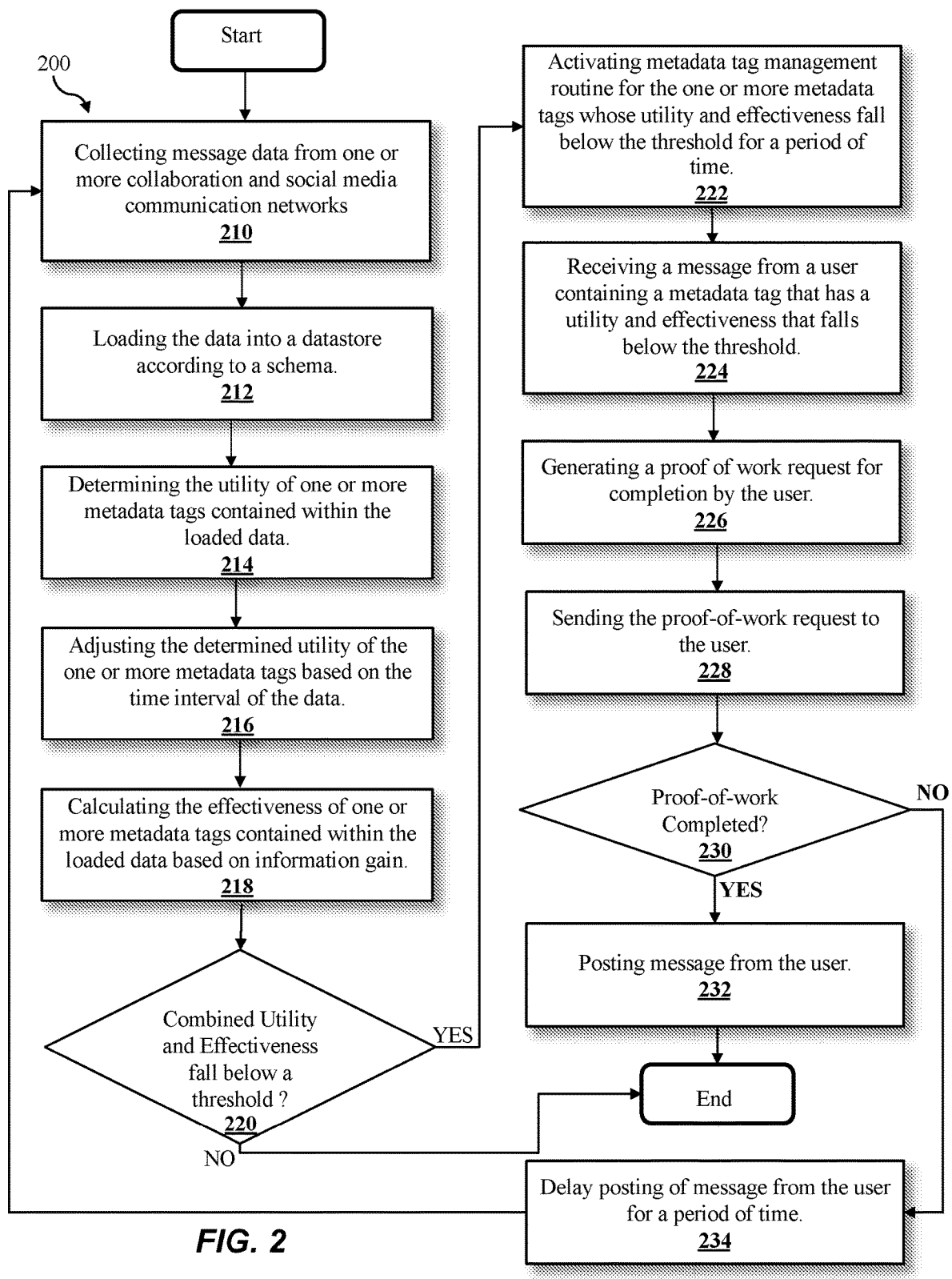
FIG. 2 is a flowchart illustrating an example method of the metadata tag management system, in accordance with an embodiment of the invention.

Referring to FIG. 2, a method 200 for metadata tag management is depicted, in accordance with an embodiment of the present invention.

Referring to block 210, the metadata tag management program 112 collects the message data 134a, 134b, 134c from one or more social media and/or collaboration networks, i.e. the applications 120a, 120b, 120c. Data collection is described in more detail above with reference to the data collection module 150.

Referring to block 212, the metadata tag management program 112 loads the message data 134a, 134b, 134c into the datastore 116 as program data 118. Message data loading is described in more detail above with reference to the data storage module 152.

Referring to block 214, the metadata tag management program 112 determines the utility of one or more metadata tags contained within the program data 118. Utility determination is described in more detail above with reference to the data analysis module 154.

Referring to block 216, the metadata tag management program 112 adjusts the utility determination based on the time interval of the program data. Utility adjustment is described in more detail above with reference to the data analysis module 154.

Referring to block 218, the metadata tag management program 112 calculates the effectiveness of the one or more metadata tags contained within the program data 118. Calculation of effectiveness is described in more detail above with reference to the data analysis module 154.

Referring to block 220, the metadata tag management program 112 determines if the utility and effectiveness of the one or more metadata tags contained within the program data 118 falls below a threshold number. If the utility and effectiveness calculation of one or more of the metadata tags contained within the program data 118 falls below a threshold number, the metadata tag management program 112 proceeds to block 222. If the utility and effectiveness calculation of one or more of the metadata tags contained within the program data 118 does not fall below a threshold number, the hashtag management program 112 terminates.

Referring to block 222, if the metadata tag management program 112 determines that the utility and effectiveness calculation for a metadata tag falls below a threshold value, the hashtag management program 112 activates a metadata tag management routine for the metadata tag. <etadata tag management activation is described in more detail above with reference to the data analysis module 154.

Referring to block 224, the metadata tag management program 112 receives a message from a user containing a metadata tag with a utility and effectiveness calculation falling below the threshold value. Message receipt is described in more detail above with reference to the data management module 156.

Referring to block 226, the metadata tag management program 112 generates a proof-of-work request for completion by the user and send the proof-of-work request to the user at block 228. Proof-of-work generation and transmission is described in more detail above with reference to the data management module 156.

Referring to block 230, if the metadata tag management program 112 determines if the user has completed the proof-of-work. If the proof-of-work is completed by the user, the metadata tag management program 112 proceeds to block 232. If the user does not complete the proof-of-work, the metadata tag management program 112 proceeds to block 234.

Referring to block 232, the metadata tag management program 112 posts the message received from the user containing the metadata tag with a utility and effectiveness calculation falling below the threshold value. Message posting is described in more detail above with reference to the data management module 156.

Referring to block 234, the metadata tag management program 112 delays the posting of the message received from the user containing the metadata tag with a utility and effectiveness calculation falling below the threshold value. Message delay is described in more detail above with reference to the data management module 156.

Following block 234, the metadata tag management program may terminate after a period of time or proceed back to block 210 to repeat the method until the utility and effectiveness of the metadata tag contained within the message exceeds a threshold value.

Figure 3:
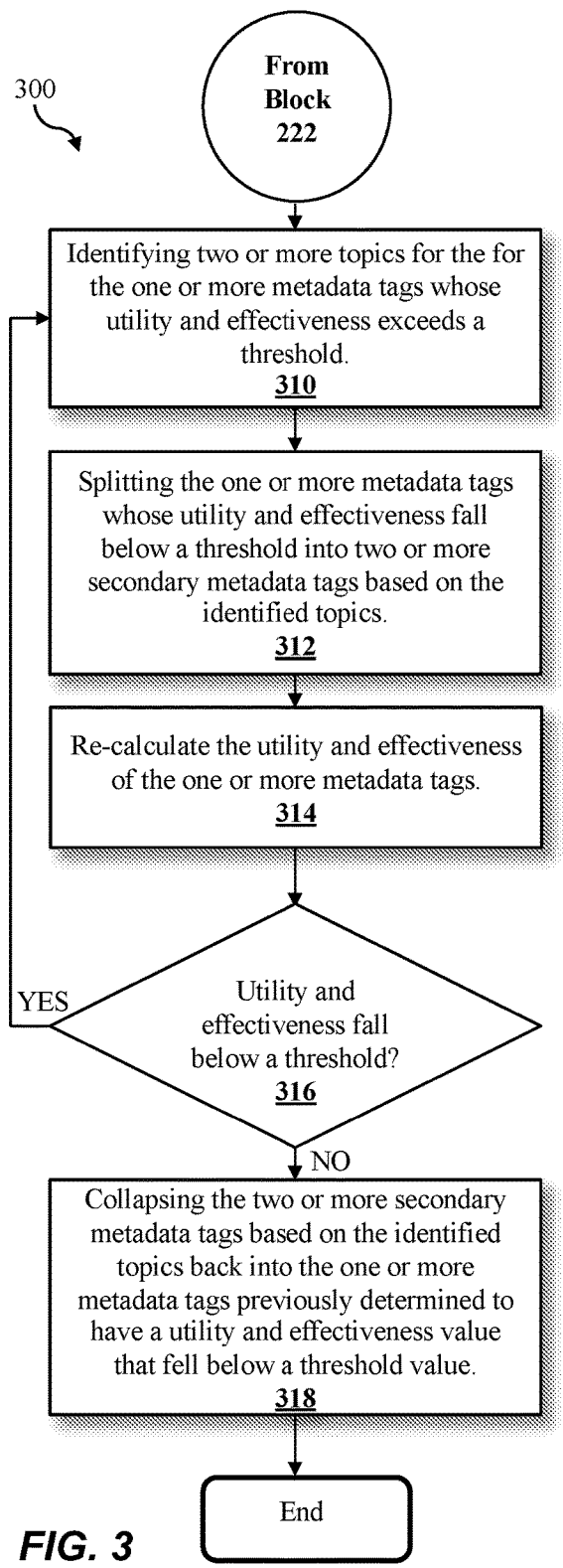
FIG. 3 is a flowchart illustrating an example method of the metadata tag management system, in accordance with an embodiment of the invention.

Referring to FIG. 3, another example method 300 for managing metadata tags is depicted, in accordance with an embodiment of the present invention. The embodiment of FIG. 3 illustrates an alternative embodiment of the method 200. The method 300 includes blocks 210-222 of the method 200 with block 310 following from block 222.

Referring to block 310, the metadata tag management program 112 identifies two or more topics for the one or more metadata tags determined to have an information gain and effectiveness calculation that fall below a threshold value. Topic identification is described in more detail above with reference to the data management module 156.

Referring to block 312, the metadata tag management program 112 splits the one or more metadata tags determined to have a utility and effectiveness calculation that falls below a threshold value into two or more secondary metadata tags based on the identified topics. Metadata tag splitting based in topic is described in more detail above with reference to the data management module 156.

Referring to block 314, metadata tag management program 112 recalculates the utility and effectiveness calculation for the one or more metadata tags. Recalculation of the utility and effectiveness of the one or more metadata tags is described in more detail above with reference to the data management module 156.

Referring to block 316, if the hashtag management program 112 determines that the utility and effectiveness of the one or more metadata tags still falls below a threshold value, the metadata tag management program 112 proceeds back to block 310 and repeats blocks 310-316 until the metadata tag management program 112 determines that the utility and effectiveness of the one or more metadata tags exceeds a threshold value. If the metadata tag management program 112 determines that the utility and effectiveness of the one or more metadata tags exceeds a threshold value, the metadata tag management program 112 proceeds to block 318.

Referring to block 318, the metadata tag management program 112 collapses the two or more secondary metadata tags based on the identified topics back into the one or more metadata tags previously determined to have a utility and effectiveness value that fell below a threshold value. Metadata tag collapse is described in more detail above with reference to the data management module 156.

Figure 4:
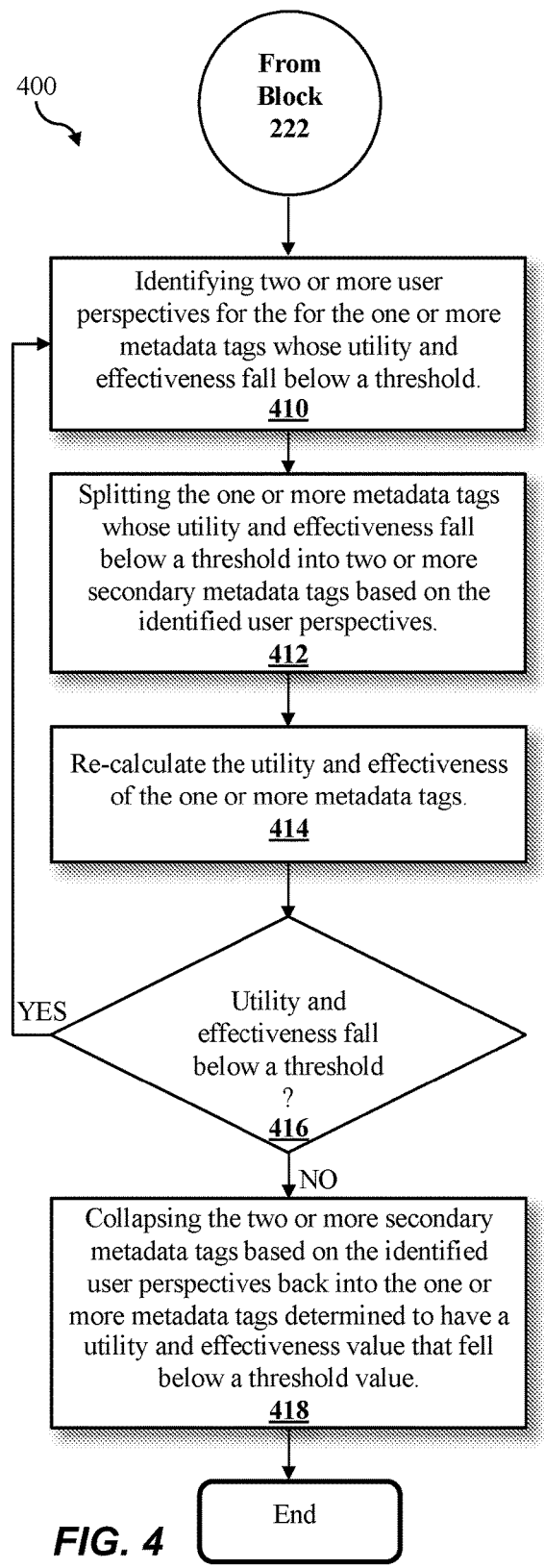
FIG. 4 is a flowchart illustrating an example method of the metadata tag management system, in accordance with an embodiment of the invention.

Referring to FIG. 4, another example method 400 for managing metadata tags is depicted, in accordance with an embodiment of the present invention. The embodiment of FIG. 4 illustrates an alternative embodiment of the method 200. The method 400 includes blocks 210-222 of the method 200 with block 410 following from block 222.

Referring to block 410, the metadata tag management program 112 identifies two or more perspectives for the one or more metadata tags determined to have a utility and effectiveness calculation that falls below a threshold value. Perspective identification is described in more detail above with reference to the data management module 156.

Referring to block 412, the metadata tag management program 112 splits the one or more metadata tags determined to have a utility and effectiveness calculation that falls below a threshold value into two or more secondary metadata tags based on the identified perspectives. Metadata tag splitting based on identified perspectives is described in more detail above with reference to the data management module 156.

Referring to block 414, metadata tag management program 112 recalculates the utility and effectiveness calculation for the one or more metadata tags. Recalculation of the utility and effectiveness of the one or more metadata tags is described in more detail above with reference to the data management module 156.

Referring to block 416, if the metadata tag management program 112 determines that the utility and effectiveness of the one or more metadata tags still falls below a threshold value, the metadata tag management program 112 proceeds back to block 410 and repeats blocks 410-416 until the metadata tag management program 112 determines that the utility and effectiveness of the one or more metadata tags exceeds a threshold value. If the metadata tag management program 112 determines that the utility and effectiveness of the one or more metadata tags exceeds a threshold value, the metadata tag management program 112 proceeds to block 418.

Referring to block 418, the metadata tag management program 112 collapses the two or more secondary metadata tags based on the identified perspectives back into the one or more metadata tags previously determined to have a utility and effectiveness value that fell below a threshold value. Metadata tag collapse is described in more detail above with reference to the data management module 156.

Figure 5:
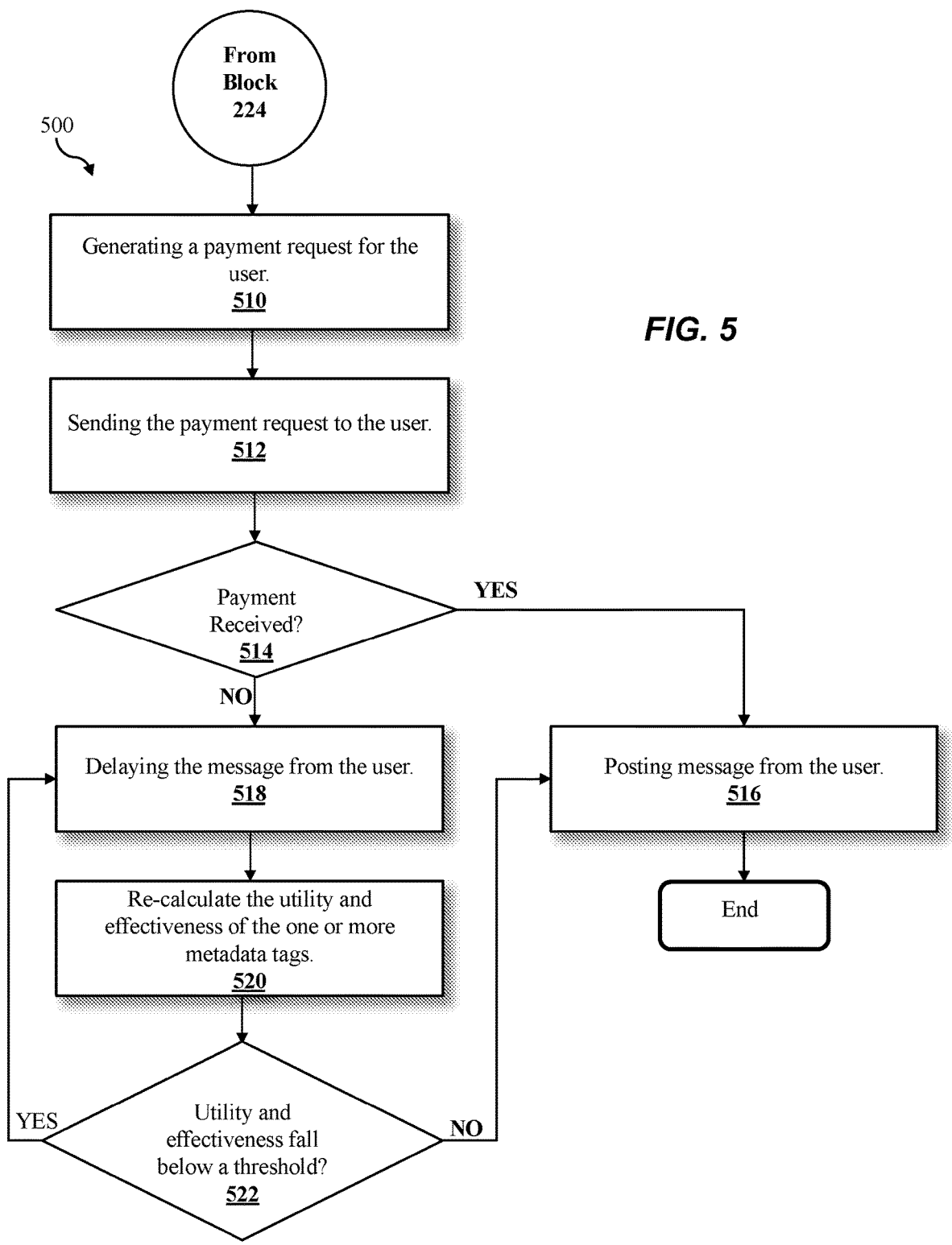
FIG. 5 is a flowchart illustrating an example method of the metadata tag management system, in accordance with an embodiment of the invention.

Referring to FIG. 5, another example method 500 for managing metadata tags is depicted, in accordance with an embodiment of the present invention. The embodiment of FIG. 5 illustrates an alternative embodiment of the method 200. The method 500 includes blocks 210-224 of the method 200 with block 510 following from block 224.

Referring to block 510, the metadata tag management program 112 generates a payment request for the user and sends the payment request to the user at block 512. Payment request generation and transmission is described in more detail above with reference to the data management module 156.

Referring to block 514, the metadata tag management program 112 determines if the user has completed the payment request. If the user has completed the payment request the metadata tag management program 112 proceeds to block 516. If the user has not completed the payment request the metadata tag management program 112 proceeds to block 518.

Referring to block 516, the metadata tag management program 112 posts the message received from the user. Message posting is described in more detail above with reference to the data management module 156.

Referring to block 518, the metadata tag management program 112 delays posting the message received from the user. Message delay is described in more detail above with reference to the data management module 156.

Referring to block 520, the metadata tag management program 112 recalculates the utility and effectiveness calculation for the one or more metadata tags. Recalculation of the utility and effectiveness of the one or more metadata tags is described in more detail above with reference to the data management module 156.

Referring to block 522, if the metadata tag management program 112 determines that the utility and effectiveness of the one or more metadata tags still falls below a threshold value, the metadata tag management program 112 proceeds back to block 518 and repeats blocks 518-522 until the metadata tag management program 112 determines that the utility and effectiveness of the one or more metadata tags exceeds a threshold value. If the metadata tag management program 112 determines that the utility and effectiveness of the one or more metadata tags exceeds a threshold value, the metadata tag management program 112 proceeds to block 516.

Figure 6:
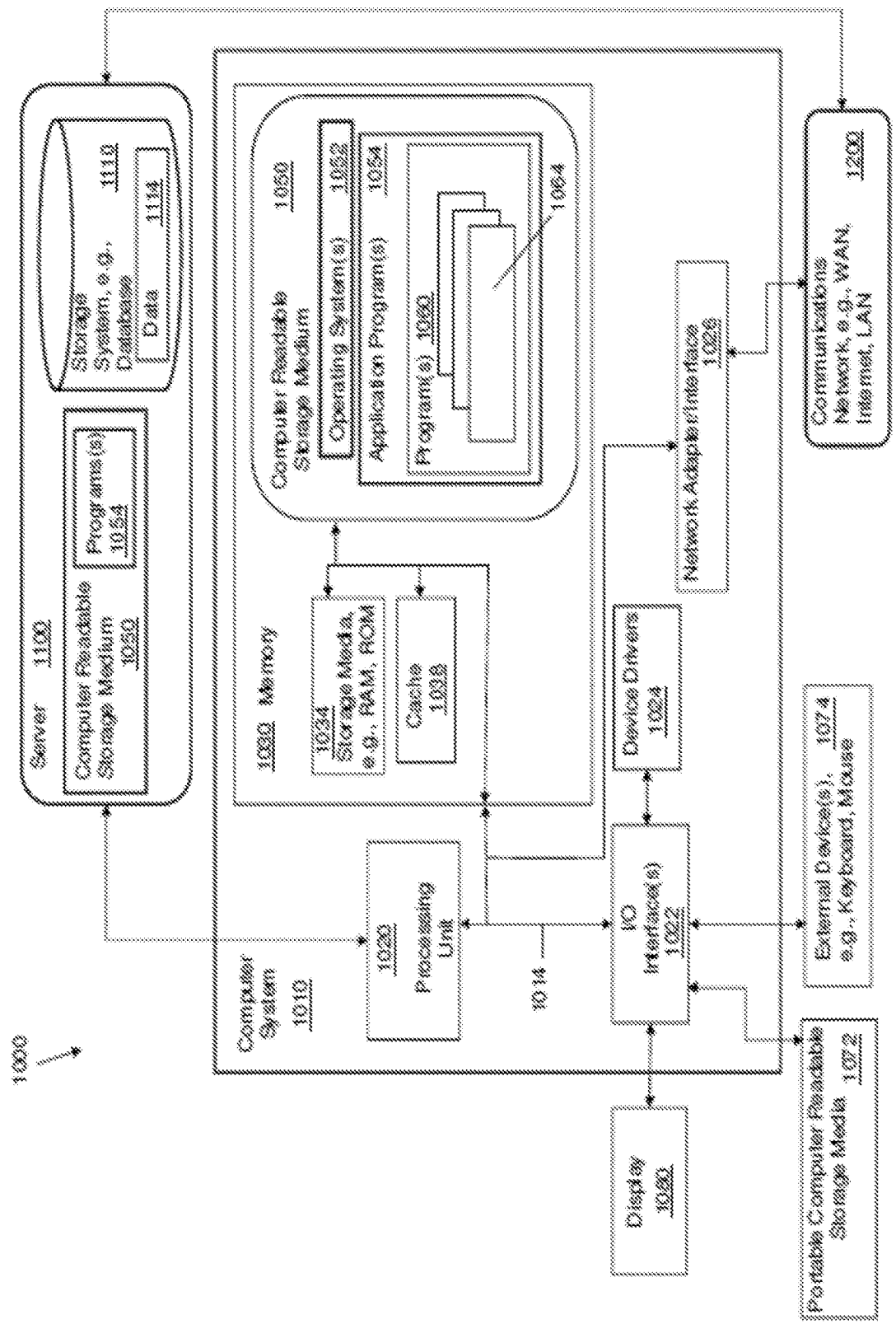
FIG. 6 is a block diagram depicting the hardware components of the metadata tag management system of FIG. 1, in accordance with an embodiment of the invention.
Figure 7:
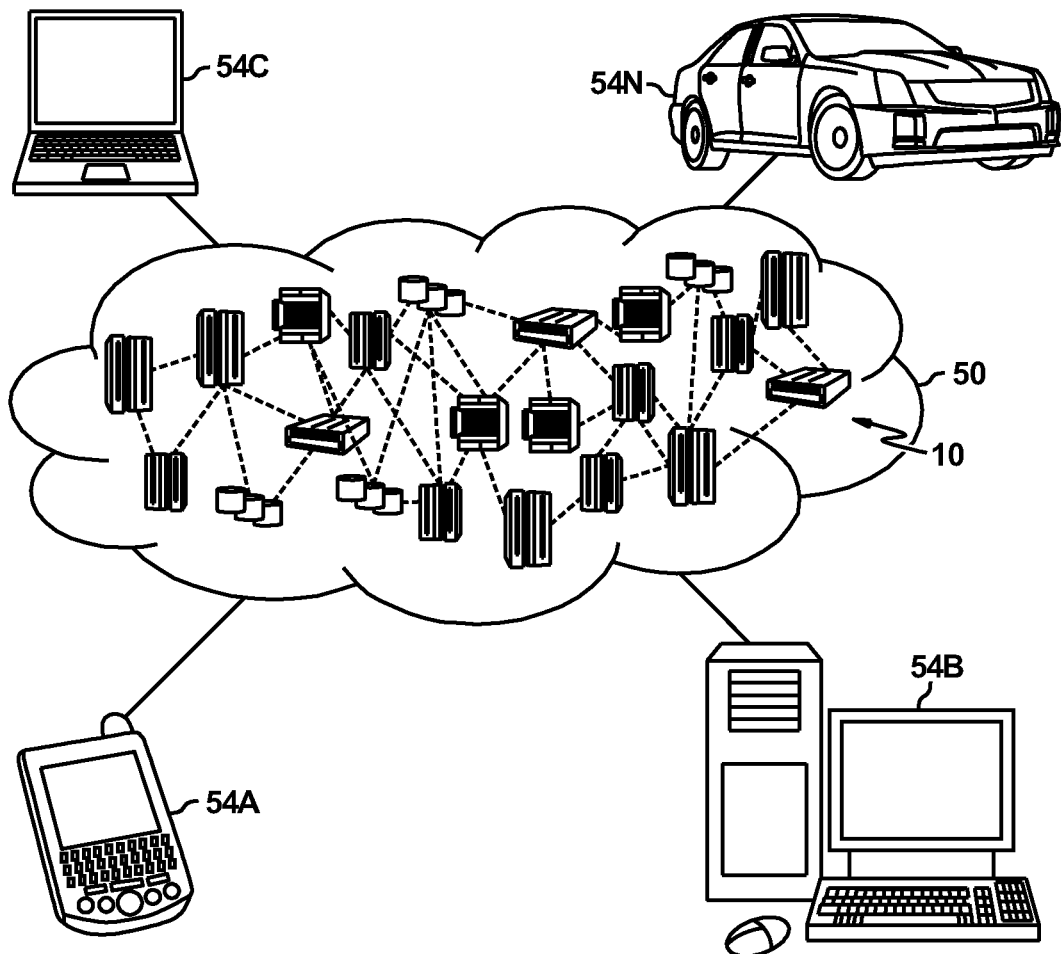
FIG. 7 illustrates a cloud computing environment, in accordance with an embodiment of the invention.

Referring to FIG. 6, a system 1000 includes a computer system or computer 1010 shown in the form of a generic computing device. The methods 200, 300, 400, and 500, for example, may be embodied in a program(s) 1060 (FIG. 6) embodied on a computer readable storage device, for example, generally referred to as memory 1030 and more specifically, computer readable storage medium 1050 as shown in FIG. 6. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 7 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 6 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 6, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200, 300, 400, and 500 (FIGS. 2-5), for example, may be embodied in one or more computer programs, generically referred to as a program(s) 1060 and can be stored in memory 1030 in the computer readable storage medium 1050. For example, the program 1060 can include the modules 150-156 described above with reference to FIG. 1*b*. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 8:
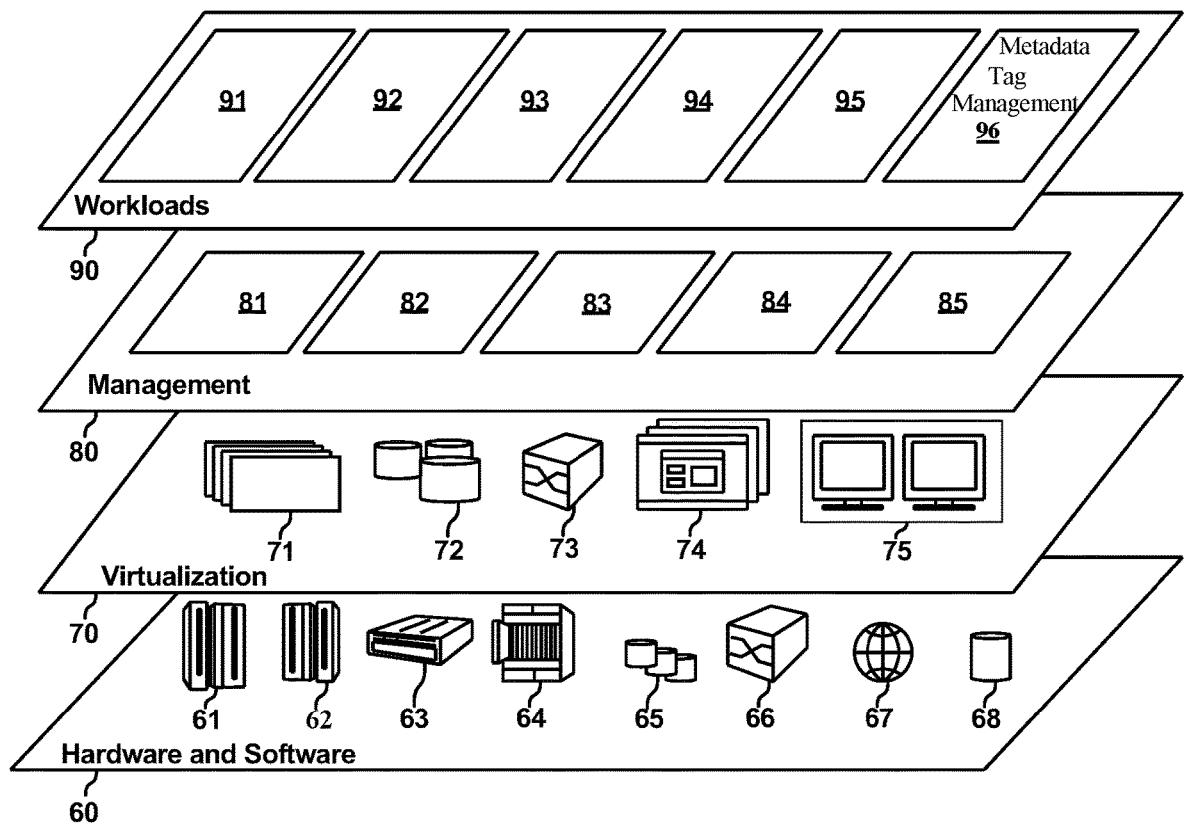
FIG. 8 illustrates a set of functional abstraction layers provided by the cloud computing environment of FIG. 7, in accordance with an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and metadata tag management 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for managing metadata tag usage, the method comprising:
    collecting, by a computing device, message data from one or more collaboration and social media communication networks, the message data containing one or more metadata tags;
    loading, by the computing device, the message data into a datastore according to a schema, the schema comprising a single entry per metadata tag contained in the message data;
    determining, by the computing device, a utility of the one or more metadata tags contained within the message data, wherein the utility is based on a calculated frequency of the one or more metadata tags;
    determining, by the computing device, an effectiveness of the one or more metadata tags contained within the message data, the effectiveness being based on a calculated information gain associated the one or more metadata tags contained in the message data, the information gain being based on a changed in entropy associated with one or more attributes of the message data associated with the one or more metadata tags, wherein the one or more attributes of the message data includes an intended topic of a message associated with a metadata tag and a perspective associated with the metadata tag;
    combining, by the computing device, the calculated frequency and the calculated information gain of the one or more metadata tags using regression analysis;
    activating, by the computing device, a metadata tag management routine for the one or more metadata tags whose combined calculated frequency and calculated information gain falls below a threshold value.

2. The method of claim 1, further comprising:
    receiving, by the computing device, a message from a user on the one or more collaboration and social media communication networks, the message containing a metadata tag that has a utility and effectiveness calculation that falls below the threshold;
    generating, by the computing device, a proof-of-work request for completion by the user;
    sending, by the computing device, the proof-of-work request to the user;
    determining, by the computing device, a status of the proof-of-work request; and
    posting, by the computing device, the message to the one or more collaboration and social media communication networks in response to determining the proof-of-work request has been completed by the user.

3. The method as in claim 2, further comprising:
delaying, by the computing device, the posting of the message to the one or more collaboration and social media communication networks in response to determining the proof-of-work request has not been completed by the user.

4. The method as in claim 1, further comprising:
adjusting, by the computing device, the calculated frequency of the one or more metadata tags based on a time interval during which the message data was collected.

5. The method as in claim 1, further comprising:
identifying, by the computing device, two or more topics for the one or more metadata tags whose combined calculated frequency and calculated information gain falls below a threshold; and
splitting, by the computing device, the one or more metadata tags whose combined calculated frequency and calculated information gain falls below the threshold into two or more secondary metadata tags based on the identified topics.

6. The method of claim 5, further comprising:
recalculating, by the computing device, the combined calculated frequency and calculated information gain of the one or more metadata tags based on continued collection of message data from the one or more collaboration and social media communication networks; and
collapsing, by the computing device, the two or more secondary metadata tags based on the identified topics back into the one or more metadata tags previously determined to have a combined calculated frequency and calculated information gain that fell below the threshold value in response to determining that the recalculated combined calculated frequency and calculated information gain exceeds a threshold.

7. A computer program product for managing metadata tags usage, the computer program product comprising:
a computer-readable storage medium having program instructions embodied therewith, wherein the computer readable storage medium is not a transitory signal per se, the program instructions executable by a computer to cause the computer to perform a method, comprising:
collecting, by a computing device, message data from one or more collaboration and social media communication networks, the message data containing one or more hashtags;
loading, by the computing device, the message data into a datastore according to a schema, the schema comprising a single entry per metadata tag contained in the message data;
determining, by the computing device, a utility of the one or more metadata tags contained within the message data, wherein the utility is based on a calculated frequency of the one or more metadata tags;
determining, by the computing device, an effectiveness of the one or more metadata tags contained within the message data, the effectiveness being based on a calculated information gain associated the one or more metadata tags contained in the message data, the information gain being based on a changed in entropy associated with one or more attributes of the message data associated with the one or more metadata tags, wherein the one or more attributes of the message data includes an intended topic of a message associated with a metadata tag and a perspective associated with the metadata tag;
combining, by the computing device, the calculated frequency and the calculated information gain of the one or more metadata tags using regression analysis;
activating, by the computing device, a metadata tag management routine for the one or more metadata tags whose combined calculated frequency and calculated information gain falls below the threshold value.

8. The computer program product of claim 7, further comprising:
receiving, by the computing device, a message from a user on the one or more collaboration and social media communication networks, the message containing a metadata tag that has a utility and effectiveness calculation that falls below the threshold;
generating, by the computing device, a proof-of-work request for completion by the user;
sending, by the computing device, the proof-of-work request to the user;
determining, by the computing device, a status of the proof-of-work request; and
posting, by the computing device, the message to the one or more collaboration and social media communication networks in response to determining the proof-of-work request has been completed by the user.

9. The computer program product as in claim 8, further comprising:
delaying, by the computing device, the posting of the message to the one or more collaboration and social media communication networks in response to determining the proof-of-work request has not been completed by the user.

10. The computer program product as in claim 7, further comprising:
adjusting, by the computing device, the calculated frequency of the one or more metadata tags based on a time interval during which the message data was collected.

11. The computer program product as in claim 7, further comprising:
identifying, by the computing device, two or more topics for the one or more metadata tags whose combined calculated frequency and calculated information gain falls below a threshold; and
splitting, by the computing device, the one or more metadata tags whose combined calculated frequency and calculated information gain falls below the threshold into two or more secondary metadata tags based on the identified topics.

12. The computer program product of claim 11, further comprising:
recalculating, by the computing device, the combined calculated frequency and calculated information gain of the one or more metadata tags based on the continued collection of message data from one or more collaboration and social media communication networks; and
collapsing, by the computing device, the two or more secondary metadata tags based on the identified topics back into the one or more metadata tags previously determined to have a combined calculated frequency and calculated information gain that fell below the threshold value in response to determining that the recalculated combined calculated frequency and calculated information gain exceeds the threshold.

13. A system for managing metadata tags usage, the system comprising:
- a computer system comprising, a processor, a computer readable storage medium, and program instructions stored on the computer readable storage medium being executable by the processor to cause the computer system to:
- collect, by a computing device, message data from one or more collaboration and social media communication networks, the message data containing one or more metadata tags;
- load, by the computing device, the message data into a datastore according to a schema, the schema comprising a single entry per metadata tag contained in the message data;
- determine, by the computing device, a utility of the one or more metadata tags contained within the message data, wherein the utility is based on a calculated frequency of the one or more metadata tags;
- determine, by the computing device, an effectiveness of the one or more metadata tags contained within the message data, the effectiveness being based on a calculated information gain associated the one or more metadata tags contained in the message data, the information gain being based on a changed in entropy associated with one or more attributes of the message data associated with the one or more metadata tags, wherein the one or more attributes of the message data includes an intended topic of a message associated with a metadata tag and a perspective associated with the metadata tag;
- combine, by the computing device, the calculated frequency and the calculated information gain of the one or more metadata tags using regression analysis;
- activate, by the computing device, a metadata tag management routine for the one or more metadata tags whose combined calculated frequency and calculated information gain falls below a threshold value.

14. The system of claim 13, further comprising:
- program instructions to receive, by the computing device, a message from a user on the one or more collaboration and social media communication networks, the message containing a metadata tag that has a utility and effectiveness calculation that falls below the threshold;
- program instructions to generate, by the computing device, a proof-of-work request for completion by the user;
- program instructions to send, by the computing device, the proof-of-work request to the user;
- program instructions to determine, by the computing device, a status of the proof-of-work request; and
- program instructions to post, by the computing device, the message to the one or more collaboration and social media communication networks in response to determining the proof-of-work request has been completed by the user.

15. The system as in claim 14, further comprising:
- program instructions to delay, by the computing device, the posting of the message to the one or more collaboration and social media communication networks in response to determining the proof-of-work request has not been completed by the user.

16. The system as in claim 13, further comprising:
- program instructions to adjust, by the computing device, the calculated frequency of the one or more metadata tags based on a time interval during which the message data was collected.

17. The system as in claim 13, further comprising:
- program instructions to identify, by the computing device, two or more topics for the one or more metadata tags whose combined calculated frequency and calculated information gain exceeds a threshold;
- program instructions to split, by the computing device, the one or more metadata tags whose combined calculated frequency and calculated information gain falls below the threshold into two or more secondary metadata tags based on the identified topics; and
- program instructions to recalculate, by the computing device, the combined calculated frequency and calculated information gain of the one or more metadata tags based on the continued collection of message data from one or more collaboration and social media communication networks; and
- program instructions to collapse, by the computing device, the two or more secondary metadata tags based on the identified topics back into the one or more metadata tags previously determined to have a combined calculated frequency and calculated information gain that fell below the threshold value in response to determining that the recalculated combined calculated frequency and calculated information gain exceeds the threshold.

* * * * *